(12) United States Patent
Ogasawara

(10) Patent No.: US 12,272,187 B2
(45) Date of Patent: Apr. 8, 2025

(54) INFORMATION PROCESSING APPARATUS AND INFORMATION PROCESSING METHOD

(71) Applicant: Mitsubishi Electric Corporation, Tokyo (JP)

(72) Inventor: Katsuhisa Ogasawara, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 297 days.

(21) Appl. No.: 17/917,273

(22) PCT Filed: Apr. 27, 2020

(86) PCT No.: PCT/JP2020/017879
§ 371 (c)(1),
(2) Date: Oct. 6, 2022

(87) PCT Pub. No.: WO2021/220321
PCT Pub. Date: Nov. 4, 2021

(65) Prior Publication Data
US 2023/0177894 A1 Jun. 8, 2023

(51) Int. Cl.
*G07C 5/08* (2006.01)

(52) U.S. Cl.
CPC .......... *G07C 5/0808* (2013.01); *G07C 5/0825* (2013.01)

(58) Field of Classification Search
CPC . G07C 5/0808; G07C 5/0825; G06F 11/3409; G06F 11/3466
See application file for complete search history.

(56) References Cited

U.S. PATENT DOCUMENTS

| 2005/0251308 A1 | 11/2005 | Funcke et al. |
| 2018/0019880 A1 | 1/2018 | Wu et al. |

FOREIGN PATENT DOCUMENTS

| JP | 7-121409 A | 5/1995 |
| JP | 7-264266 A | 10/1995 |
| JP | 2004-126854 A | 4/2004 |
| JP | 2005-513356 A | 5/2005 |
| JP | 2009-282751 A | 12/2009 |
| JP | 2015-210737 A | 11/2015 |
| JP | 2018-519705 A | 7/2018 |
| WO | 2017/171634 A1 | 10/2017 |

OTHER PUBLICATIONS

International Search Report and Written Opinion mailed on Sep. 1, 2020, received for PCT Application PCT/JP2020/017879, filed on Apr. 27, 2020, 9 pages including English Translation.

*Primary Examiner* — Alan D Hutchinson
(74) *Attorney, Agent, or Firm* — XSENSUS LLP

(57) ABSTRACT

It is an object to provide technology enabling continuous verification of highly reliable function units. An information processing apparatus includes a verification function unit to inject injected verification data into an input to perform a highly reliable function unit, and verify operation of the highly reliable function unit based on output from an output when performing the highly reliable function unit in a verification execution environment being a secure execution environment against a system execution environment. The information processing apparatus includes a time management function unit to manage timing of verifying operation and a maximum time of verifying operation.

7 Claims, 14 Drawing Sheets

FIG. 2

| | 1220 | HIGHLY RELIABLE FUNCTION 1 VERIFICATION DATA ENTRY (MAJORITY MECHANISM) 2000-1 | HIGHLY RELIABLE FUNCTION 2 VERIFICATION DATA ENTRY (ERROR CORRECTION) 2000-2 | ... | HIGHLY RELIABLE FUNCTION n2 VERIFICATION DATA ENTRY (MULTIPLE REDUNDANCY SYSTEM) 2000-n2 |
|---|---|---|---|---|---|
| 2300-1 | OPERATION MODE 1 | VERIFICATION OPERATION TIMING 1-1<br>INJECTED VERIFICATION DATA 1-1<br>EXPECTED OUTPUT DATA 1-1<br>EXPECTED OPERATION LOG 1-1<br>OUTPUT CONTROL FLAG 1-1<br>MAXIMUM VERIFICATION TIME 1-1 | NOT TO BE VERIFIED | | NOT TO BE VERIFIED |
| 2300-2 | OPERATION MODE 2 | NOT TO BE VERIFIED | VERIFICATION OPERATION TIMING 2-2<br>INJECTED VERIFICATION DATA 2-2<br>EXPECTED OUTPUT DATA 2-2<br>EXPECTED OPERATION LOG 2-2<br>OUTPUT CONTROL FLAG 2-2<br>MAXIMUM VERIFICATION TIME 2-2 | | VERIFICATION OPERATION TIMING 2-n2<br>INJECTED VERIFICATION DATA 2-n2<br>EXPECTED OUTPUT DATA 2-n2<br>EXPECTED OPERATION LOG 2-n2<br>OUTPUT CONTROL FLAG 2-n2<br>MAXIMUM VERIFICATION TIME 2-n2 |
| ... | | | | | |
| 2300-n3 | OPERATION MODE n3 | VERIFICATION OPERATION TIMING n3-1<br>INJECTED VERIFICATION DATA n3-1<br>EXPECTED OUTPUT DATA n3-1<br>EXPECTED OPERATION LOG n3-1<br>OUTPUT CONTROL FLAG n3-1<br>MAXIMUM VERIFICATION TIME n3-1 | VERIFICATION OPERATION TIMING n3-2<br>INJECTED VERIFICATION DATA n3-2<br>EXPECTED OUTPUT DATA n3-2<br>EXPECTED OPERATION LOG n3-2<br>OUTPUT CONTROL FLAG n3-2<br>MAXIMUM VERIFICATION TIME n3-2 | | NOT TO BE VERIFIED |

FIG. 3

| | HIGHLY RELIABLE FUNCTION 1 STATE DATA ENTRY (MAJORITY MECHANISM) | HIGHLY RELIABLE FUNCTION 2 STATE DATA ENTRY (ERROR CORRECTION) | ... | HIGHLY RELIABLE FUNCTION n2 STATE DATA ENTRY (MULTIPLE REDUNDANCY SYSTEM) | OPERATION MODE POSSIBILITY STATE ENTRY |
|---|---|---|---|---|---|
| OPERATION MODE 1 | TO BE USED:NORMAL | NOT TO BE USED | | NOT TO BE USED | OPERABLE |
| OPERATION MODE 2 | NOT TO BE USED | NOT TO BE USED | | TO BE USED:NORMAL | OPERABLE |
| ... | | | | | |
| OPERATION MODE m | TO BE USED:NORMAL | TO BE USED:ABNORMAL | | NOT TO BE USED | NOT OPERABLE |
| ... | | | | | |
| OPERATION MODE n3 | NOT TO BE USED | NOT TO BE USED | | NOT TO BE USED | OPERABLE |

F I G. 5
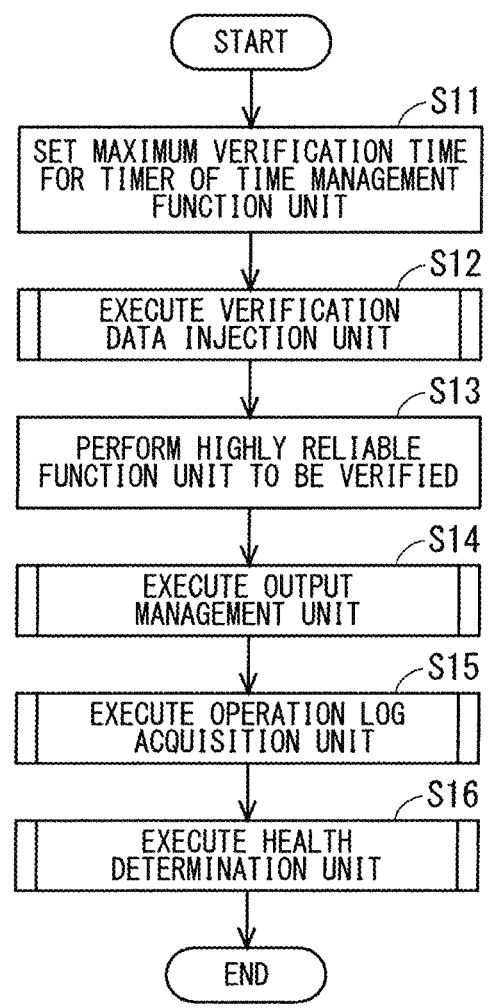

F I G. 8
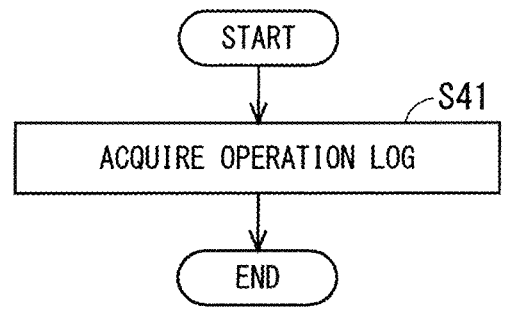

F I G. 1 3
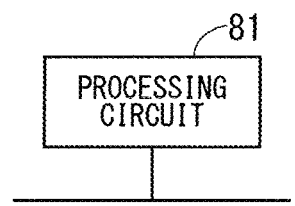

F I G. 1 4
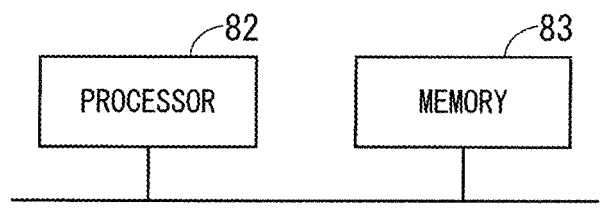

INFORMATION PROCESSING APPARATUS AND INFORMATION PROCESSING METHOD

CROSS-REFERENCE TO RELATED APPLICATION

The present application is based on PCT filing PCT/JP2020/017879, filed Apr. 27, 2020, the entire contents of which is incorporated herein by reference.

TECHNICAL FIELD

The present disclosure relates to information processing apparatuses and information processing methods.

BACKGROUND ART

In a typical automatic control system, a plurality of functions cooperate and integrate for recognition, determination, and control. An autonomous driving system as such an automatic control system includes an autonomous driving controller to generate an optimum control parameter from a vehicle ambient condition and an engine controller, a brake controller, and a steering controller to respectively achieve engine control, brake control, and steering control of a vehicle, for example. Autonomous driving cannot be continued in the event of abnormality anywhere in the autonomous driving system. For continuation in such as case, the automatic control system is required to perform maintenance operation (fail operation) before transition to a secured state and transition (fail-safe operation) to a safe state.

In the automatic control system, a range of responsibility taken by the system increases with increasing level of autonomy, such as a level of autonomous driving. For example, autonomous driving has a level of autonomous driving defined by Society of Automotive Engineers (SAE) International, and the range of responsibility taken by the system increases with increasing level.

To address this, a system configuration using highly reliable function units (highly reliable functions) including (1) a monitoring mechanism, (2) an error detection/correction function, (3) a majority mechanism, and (4) a multiple redundancy system to ensure safety in the event of failure has been proposed. The highly reliable function units (highly reliable functions), however, include functions not operated for a long time period until failure occurs even during operation after shipment of goods, such as the function (4), and functions into which data outside a normal data range is not input, such as the functions (1) to (3). It has thus been difficult to appropriately ensure that the system as a whole functions normally until failure occurs.

To address such a problem, Patent Document 1 proposes a system by which a fault detection system to detect a fault of electronic equipment itself can be checked at any time. Patent Document 2 discloses a system and a method to verify integrity of an electronic device.

PRIOR ART DOCUMENTS

Patent Documents

Patent Document 1: Japanese Patent Application Laid-Open No. 7-264266
Patent Document 2: Japanese Unexamined Patent Application Publication (Translation of PCT Application) No. 2018-519705

SUMMARY

Problem to be Solved by the Invention

Patent Document 1 discloses that whether a signal receiving circuit of a fault monitor to display information in the presence of a fault and a fault signal transmission line from the electronic equipment are normal is checked, but does not account for continuous verification of operation of highly reliable function units operated with a program running on the system. Patent Document 2 discloses verification of tampering with the system using a secure execution environment, but similarly does not account for verification of operation of highly reliable function units. When verification data is injected into the system in operation for verification, planned, safe, and secure verification without interfering with processing of the running program has been difficult.

The present disclosure has been conceived in view of a problem as described above, and it is an object of the present disclosure to provide technology enabling continuous verification of highly reliable function units.

Means to Solve the Problem

An information processing apparatus according to the present disclosure includes: a plurality of highly reliable function units each including an input and an output; a normal function unit capable of performing processing in a system execution environment, and capable of calling one of the highly reliable function units corresponding to the processing and injecting data used to perform the highly reliable function unit into the input while performing the processing; a verification table to hold injected verification data used to verify operation of the highly reliable function unit; a verification function unit to inject the injected verification data into the input to perform the highly reliable function unit, and verify operation of the highly reliable function unit based on output from the output when performing the highly reliable function unit in a verification execution environment being a secure execution environment against the system execution environment; and a time management function unit to manage timing of verifying operation and a maximum time of verifying operation.

Effects of the Invention

According to the present disclosure, operation of the highly reliable function units is verified in the verification execution environment being the secure execution environment against the system execution environment, and the timing of verifying operation and the maximum time of verifying operation are managed. According to such a configuration, the highly reliable function units can continuously be verified.

The objects, features, aspects, and advantages of the present disclosure will become more apparent from the following detailed description and the accompanying drawings.

BRIEF DESCRIPTION OF DRAWINGS

FIG. 2 shows an example of contents of a highly reliable function verification table in Embodiment 1.

FIG. 3 shows an example of contents of a highly reliable function state table in Embodiment 1.

FIG. 5 is a flowchart showing operation of a verification execution unit in Embodiment 1.

FIG. 8 is a flowchart showing operation of an operation log acquisition unit in Embodiment 1.

FIG. 13 is a block diagram showing a hardware configuration of an information processing apparatus in a modification.

FIG. 14 is a block diagram showing a hardware configuration of an information processing apparatus in a modification.

DESCRIPTION OF EMBODIMENTS

Embodiment 1

Figure 1:
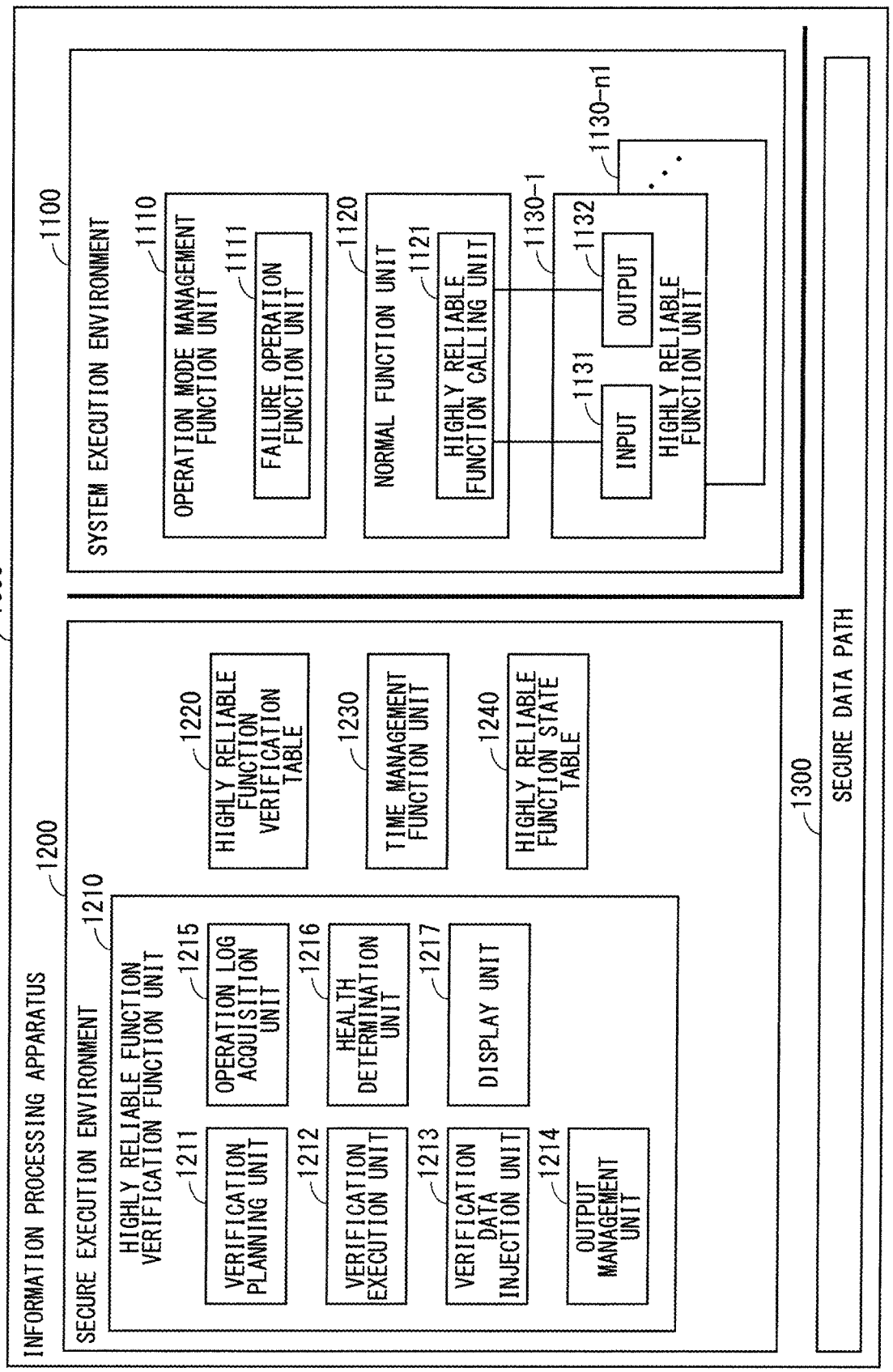
FIG. 1 is a block diagram showing a configuration of an information processing apparatus in Embodiment 1.

FIG. 1 is a block diagram showing a configuration of an information processing apparatus 1000 in Embodiment 1. The information processing apparatus 1000 may be an information processing apparatus of an automatic control system (not shown), such as an autonomous driving system mounted on an autonomous vehicle.

A system execution environment 1100 and a secure execution environment 1200 are defined for the information processing apparatus 1000. The system execution environment 1100 is an environment to perform a normal function corresponding to a function requirement of the system. The secure execution environment 1200 is a verification execution environment which is substantially isolated from the system execution environment 1100 and in which secure execution is ensured against the system execution environment 1100. The information processing apparatus 1000 includes a secure data path 1300 which is provided between the system execution environment 1100 and the secure execution environment 1200 and on which secure data communication is ensured.

An operation mode management function unit 1110, a normal function unit 1120, and a plurality of highly reliable function units 1130 are provided in the system execution environment 1100. As will be described below, the operation mode management function unit 1110, the normal function unit 1120, and the plurality of highly reliable function units 1130 may each be dedicated hardware or a function performed by software, such as a program.

The operation mode management function unit 1110 manages, from among a plurality of operation modes operable by the system, an operation mode operated by the system in the system execution environment 1100. For example, the plurality of operation modes of the autonomous driving system include an ordinary road autonomous driving mode, a freeway autonomous driving mode, an automatic parking mode, and a manual driving mode.

The operation mode management function unit 1110 includes a failure operation function unit 1111, and the failure operation function unit 1111 has a system operation function to switch the operation mode operated by the system in the event of failure of part of the system. The operation mode switched by the failure operation function unit 1111 includes a manual mode, such as the manual driving mode.

The normal function unit 1120 has a system operation function to perform processing in the operation mode managed by the operation mode management function unit 1110. The system operation function is also referred to as a system processing function.

The plurality of highly reliable function units 1130 (highly reliable function units 1130-1 to 1130-$n$1 in FIG. 1) have a function to make the processing function of the normal function unit 1120 highly reliable. The function made highly reliable includes (1) a monitoring mechanism, (2) an error detection/correction function, (3) a majority mechanism, and (4) a multiple redundancy system, for example. The plurality of highly reliable function units 1130 each include, as interfaces between the highly reliable function unit 1130 and the normal function unit 1120, an input 1131 to receive input of data from the normal function unit 1120 and an output 1132 to output data to the normal function unit 1120.

The normal function unit 1120 includes a highly reliable function calling unit 1121, and the highly reliable function calling unit 1121 calls each of the highly reliable function units 1130. The normal function unit 1120 can thus call (perform), while performing processing, one of the highly reliable function units 1130 corresponding to the processing, and inject (input) data used to perform the highly reliable function unit 1130 into the input 1131. While a single normal function unit 1120 is shown in FIG. 1, the number of normal function units 1120 is not limited to one, and the information processing apparatus 1000 may include a plurality of normal function units 1120 each having the system operation function.

A highly reliable function verification function unit 1210, a highly reliable function verification table 1220, a time management function unit 1230, and a highly reliable function state table 1240 are provided in the secure execution environment 1200. As will be described below, the highly reliable function verification function unit 1210 and the time management function unit 1230 may each be dedicated hardware or a function performed by software, such as a program.

The highly reliable function verification table 1220 as a verification table holds injected verification data used to verify operation of the highly reliable function unit 1130.

The highly reliable function verification function unit 1210 as a verification function unit verifies whether the highly reliable function unit 1130 operable in parallel with the normal function unit 1120 operates healthily, and the system as a whole functions normally. Specifically, the highly reliable function verification function unit 1210 injects (inputs) the above-mentioned injected verification data into the input 1131 to perform the highly reliable function unit 1130 in the secure execution environment 1200. The highly reliable function verification function unit 1210 verifies operation of the highly reliable function unit 1130 based on output from the output 1132 when performing the highly reliable function unit 1130.

The time management function unit 1230 manages timing of verifying operation and a maximum time of verifying operation.

The highly reliable function state table 1240 as a state table holds, as a result of verifying operation performed by the highly reliable function verification function unit 1210, state data indicating whether the highly reliable function unit 1130 is normal.

The highly reliable function verification function unit 1210, the highly reliable function verification table 1220, the time management function unit 1230, and the highly reliable function state table 1240 will be described below.

FIG. 2 shows an example of contents of the highly reliable function verification table 1220 in Embodiment 1.

The highly reliable function units 1130 have verification data entries 2000 (verification data entries 2000-1 to 2000-$n2$ in the example of FIG. 2) unique to the highly reliable function units 1130. Contents of data necessary to verify operation are set for each of the verification data entries 2000 in the highly reliable function verification table 1220. The contents of data necessary to verify operation are also set for each of operation modes 2300 (operation modes 2300-1 to 2300-$n3$ in the example of FIG. 2) manageable by the operation mode management function unit 1110 in the highly reliable function verification table 1220. Depending on a combination of a verification data entry 2000 and an operation mode 2300 of the highly reliable function unit 1130, however, not the contents of data necessary to verify operation but "NOT TO BE VERIFIED" is set.

The contents of the highly reliable function verification table 1220 in the example of FIG. 2 include verification operation timing, injected verification data, expected output data, an expected operation log, an output control flag, and a maximum verification time.

The verification operation timing indicates timing (time) when the highly reliable function verification function unit 1210 starts verifying operation of the highly reliable function unit 1130. The injected verification data is data injected (input) into the input 1131 of the highly reliable function unit 1130 as described above. The expected output data indicates expected output, namely an expected value, from the output 1132 when the highly reliable function verification function unit 1210 performs the highly reliable function unit 1130. The expected operation log indicates an expected operation log of the highly reliable function unit 1130 when the highly reliable function verification function unit 1210 performs the highly reliable function unit 1130.

The output control flag indicates whether the normal function unit 1120 calls and performs the highly reliable function unit 1130 after the highly reliable function verification function unit 1210 performs the highly reliable function unit 1130. That is to say, the output control flag indicates whether to perform control transition to transition control of the highly reliable function unit 1130 to the normal function unit 1120 after the highly reliable function verification function unit 1210 performs the highly reliable function unit 1130. For example, the output control flag indicating that control transition is not performed may be set when the verification operation timing is set. For example, the output control flag indicating that control transition is performed may be set when the verification operation timing is not set.

The maximum verification time indicates a maximum allowable time of verifying operation of the highly reliable function unit 1130.

The highly reliable function verification function unit 1210 in FIG. 1 will be described in detail next. The highly reliable function verification function unit 1210 includes a verification planning unit 1211, a verification execution unit 1212, a verification data injection unit 1213, an output management unit 1214, an operation log acquisition unit 1215, a health determination unit 1216, and a display unit 1217.

The verification planning unit 1211 determines a highly reliable function unit 1130 to be verified from the plurality of highly reliable function units 1130 based on the verification operation timing in the highly reliable function verification table 1220, and plans timing of verifying operation of the highly reliable function unit 1130 to be verified.

The verification data injection unit 1213 injects (inputs) the injected verification data in the highly reliable function verification table 1220 into the input 1131 of the highly reliable function unit 1130 to be verified.

The verification execution unit 1212 performs, at the timing planned by the verification planning unit 1211, the highly reliable function unit 1130 to be verified into which the injected verification data has been injected.

The output management unit 1214 acquires, when the verification execution unit 1212 has performed the highly reliable function unit 1130 to be verified, output (data of an output value) from the output 1132 of the highly reliable function unit 1130 to be verified. The output management unit 1214 also controls operation of the output 1132 of the highly reliable function unit 1130 to be verified so that the normal function unit 1120 performs the highly reliable function unit 1130 to be verified based on the output control flag in the highly reliable function verification table 1220.

The operation log acquisition unit 1215 acquires the operation log of the highly reliable function unit 1130 to be verified when the verification execution unit 1212 has performed the highly reliable function unit 1130 to be verified.

The health determination unit 1216 compares the output acquired by the output management unit 1214 and the expected output data in the highly reliable function verification table 1220, and compares the operation log acquired by the operation log acquisition unit 1215 and the expected operation log in the highly reliable function verification table 1220. The health determination unit 1216 determines the health of the highly reliable function unit 1130 to be verified based on results of comparison to verify operation of the highly reliable function unit 1130. The health determination unit 1216 of the highly reliable function verification function unit 1210 updates the above-mentioned state data held by the highly reliable function state table 1240 each time operation is verified.

The display unit 1217 displays information to a user and the like. While the display unit 1217 is included in the highly reliable function verification function unit 1210 in Embodiment 1, the display unit 1217 may not be included in the highly reliable function verification function unit 1210.

The verification planning unit 1211 sets the verification operation timing for the time management function unit 1230, and the verification execution unit 1212 sets the maximum verification time for the time management function unit 1230. The time management function unit 1230 thus manages the timing of verifying operation and the maximum time of verifying operation. Due to management of the time management function unit 1230, the highly reliable function verification function unit 1210 verifies operation of the highly reliable function unit 1130 in parallel with processing performed by the normal function unit 1120 without interfering with processing performed by the normal function unit 1120.

FIG. 3 shows an example of contents of the highly reliable function state table 1240 in Embodiment 1.

The highly reliable function units 1130 have state data entries 3000 (state data entries 3000-1 to 3000-$n2$ in the example of FIG. 3) unique to the highly reliable function units 1130. A state of the highly reliable function verification function unit 1210 is held for each of the state data entries 3000 in the highly reliable function state table 1240. The state of the highly reliable function verification function unit 1210 and an operation mode possibility state entry 3100 are held for each of operation modes 3300 (operation modes 3300-1 to 3300-n3 in the example of FIG. 3) manageable by the operation mode management function unit 1110 in the highly reliable function state table 1240.

The state held for each of the operation modes 3300 includes at least one of usability data, normal state data, abnormal state data, and operation mode possibility data. The usability data indicates whether the highly reliable function unit 1130 is to be used in the operation mode 3300. The usability data shown as "TO BE USED" in FIG. 3 indicates that the highly reliable function unit 1130 is to be used by the normal function unit 1120 and the like in the operation mode 3300. The usability data shown as "NOT TO BE USED" in FIG. 3 indicates that the highly reliable function unit 1130 is not to be used by the normal function unit 1120 and the like in the operation mode 3300. The normal state data indicates that the highly reliable function unit 1130 to be used is normal. The abnormal state data indicates that the highly reliable function unit 1130 to be used is abnormal.

The operation mode possibility data indicates whether the highly reliable function unit 1130 used in the operation mode 3300 is operable. When the abnormal state data is present for any of the highly reliable function units 1130 used in the operation mode 3300, the operation mode possibility state entry 3100 holds "NOT OPERABLE" indicating that the above-mentioned operation is not possible. On the other hand, when the abnormal state data is present for none of the highly reliable function units 1130 used in the operation mode 3300, the operation mode possibility state entry 3100 holds "OPERABLE" indicating that the above-mentioned operation is possible.

As for the highly reliable function units 1130 used in the operation mode managed by the operation mode management function unit 1110, assume herein that the abnormal state data is included in the highly reliable function state table 1240. In this case, the failure operation function unit 1111 switches the operation mode operated by the system, and the display unit 1217 displays abnormality.

<Operation>
<Operation of Verification Planning Unit>

Figure 4:
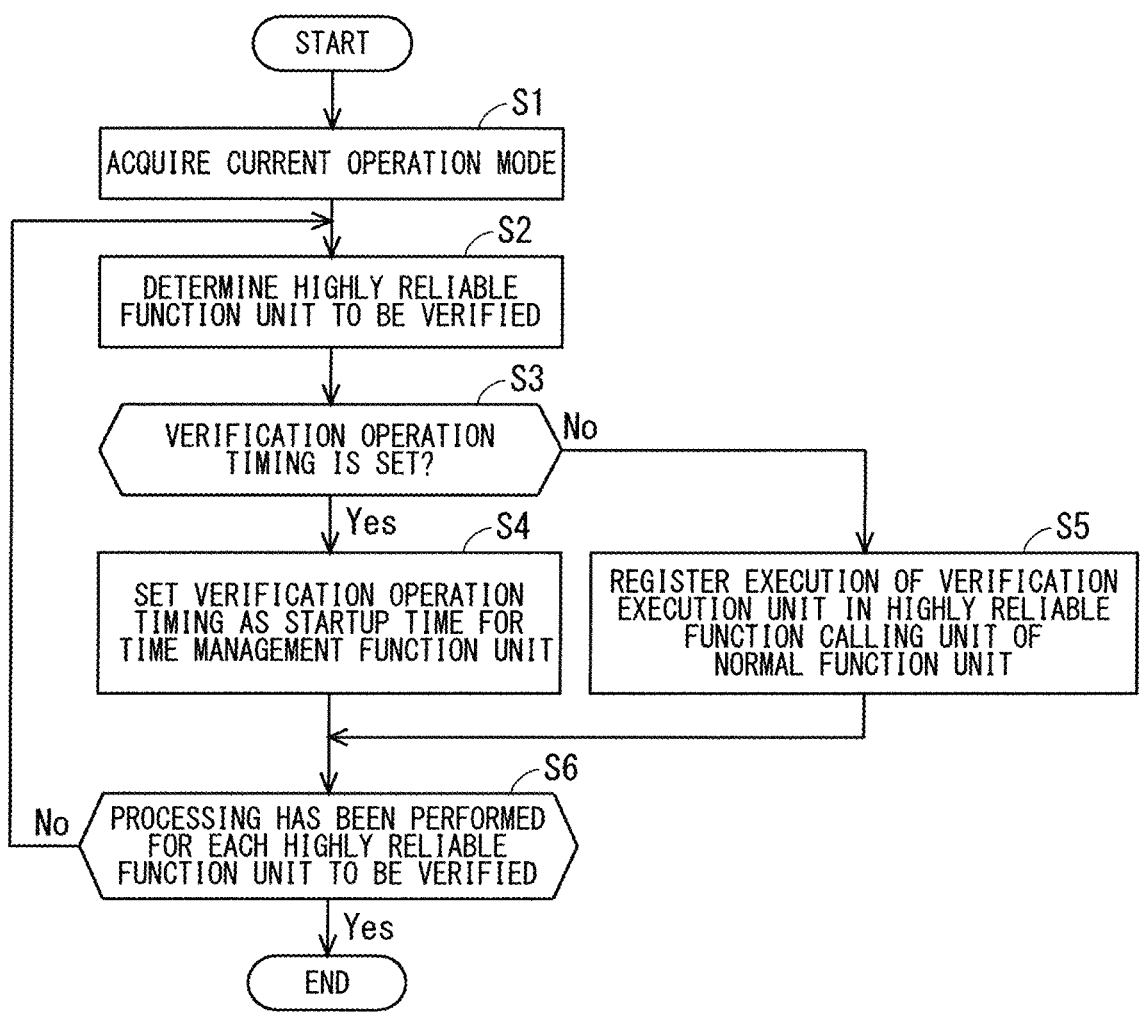
FIG. 4 is a flowchart showing operation of a verification planning unit in Embodiment 1.

FIG. 4 is a flowchart showing operation of the verification planning unit 1211 in Embodiment 1. The verification planning unit 1211 starts operation in the secure execution environment 1200 at each of the start and the change of the operation mode managed by the operation mode management function unit 1110.

In step S1, the verification planning unit 1211 acquires a current operation mode managed by the operation mode management function unit 1110 in the system execution environment 1100.

In step S2, the verification planning unit 1211 determines, for the operation mode acquired in step S1, one of the highly reliable function units 1130 that is not a highly reliable function unit 1130 that is out of verification in the highly reliable function verification table 1220 as the highly reliable function unit 1130 to be verified.

In step S3, the verification planning unit 1211 checks, for the operation mode acquired in step S1, the verification operation timing in the highly reliable function verification table 1220, and checks whether the verification operation timing is set. Processing proceeds to step S4 when it is determined that the verification operation timing is set, and proceeds to step S5 when it is determined that the verification operation timing is not set.

In step S4, the verification planning unit 1211 sets, for the time management function unit 1230, the verification operation timing as startup time of the verification execution unit 1212. Operation is thereby verified not in synchronization with operation of the normal function unit 1120. Processing then proceeds to step S6.

In step S5, the verification planning unit 1211 registers execution of the verification execution unit 1212 in the highly reliable function calling unit 1121 of the normal function unit 1120 so that the normal function unit 1120 verifies the highly reliable function unit 1130 when calling the highly reliable function unit 1130. In this case, the verification execution unit 1212 is executed during operation of the normal function unit 1120. After step S5, processing proceeds to step S6.

In step S6, in a case where the number of highly reliable function units 1130 to be verified is two or more, the verification planning unit 1211 determines whether step S4 or S5 has been performed for each of the highly reliable function units 1130 to be verified. Operation in FIG. 4 ends when it is determined that step S4 or S5 has been performed for each of the highly reliable function units 1130 to be verified, and processing returns to step S2 when it is determined negatively.

Step S4 or S5 is performed for each of the highly reliable function units 1130 to be verified to plan timing of verifying operation of each of the highly reliable function units 1130 to be verified. The above-mentioned timing may be planned so that a highly reliable function unit 1130 to be verified whose operation has not been verified is performed preferentially.

<Operation of Verification Execution Unit>

FIG. 5 is a flowchart showing operation of the verification execution unit 1212 in Embodiment 1. Operation of the time management function unit 1230 is also shown in FIG. 5. After operation in FIG. 4 is performed, the verification execution unit 1212 starts operation in the secure execution environment 1200 according to the timing planned by the verification planning unit 1211.

In step S11, the verification execution unit 1212 acquires, for a combination of the current operation mode and the verification data entry 2000 of the highly reliable function unit 1130 to be verified, the maximum verification time from the highly reliable function verification table 1220. The verification execution unit 1212 sets the acquired maximum verification time for a timer of the time management function unit 1230 as the maximum time of verifying operation, and the time management function unit 1230 starts the timer. Setting of the maximum verification time, setting of the timer, and startup of the timer are performed for the highly reliable function unit 1130 to be verified for which the tuning has been set by the verification planning unit 1211. The verification execution unit 1212 performs processing in and after step S12 in FIG. 5 for the highly reliable function unit 1130 to be verified for which setting of the maximum verification time, setting of the timer, and startup of the timer have been performed.

In step S12, the verification execution unit 1212 executes the verification data injection unit 1213.

In step S13, the verification execution unit 1212 activates and performs the highly reliable function unit 1130 to be verified into which the injected verification data has been injected.

In step S14, the verification execution unit 1212 executes the output management unit 1214, and the output management unit 1214 acquires output from the highly reliable function unit 1130 operating during step S13.

In step S15, the verification execution unit 1212 executes the operation log acquisition unit 1215, and the operation log acquisition unit 1215 acquires the operation log of the highly reliable function unit 1130, the normal function unit 1120, and the system operating during steps S12 to S14.

In step S16, the verification execution unit 1212 executes the health determination unit 1216, and, after step S16, operation in FIG. 5 ends.

<Operation of Verification Data Injection Unit>

Figure 6:
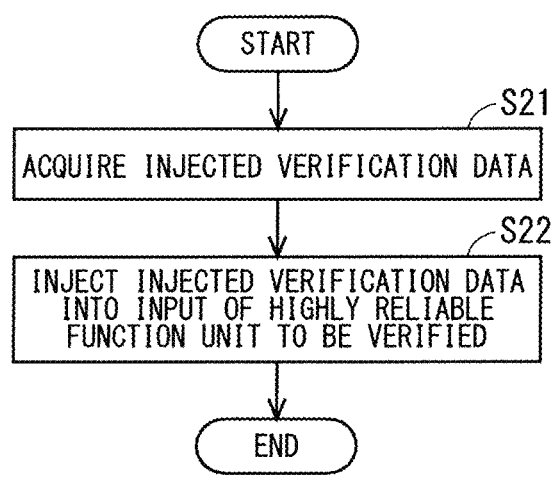
FIG. 6 is a flowchart showing operation of a verification data injection unit in Embodiment 1.

FIG. 6 is a flowchart showing operation of the verification data injection unit 1213 in Embodiment 1. When called by the verification execution unit 1212 in step S12 (FIG. 5), the verification data injection unit 1213 starts operation in the secure execution environment 1200.

In step S21, the verification data injection unit 1213 acquires, for the combination of the current operation mode and the verification data entry 2000 of the highly reliable function unit 1130 to be verified, the injected verification data from the highly reliable function verification table 1220.

In step S22, the verification data injection unit 1213 injects the injected verification data acquired in step S21 into the input 1131 of the highly reliable function unit 1130 to be verified. Operation in FIG. 6 then ends.

<Operation of Output Management Unit>

Figure 7:
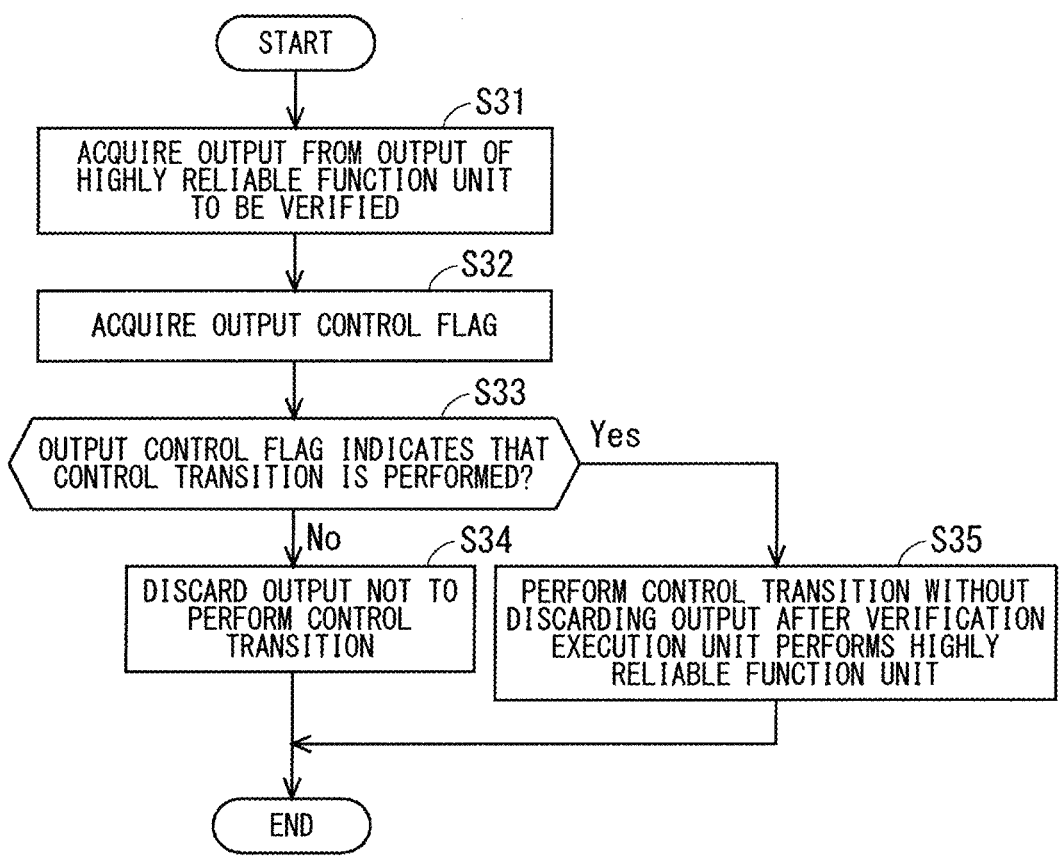
FIG. 7 is a flowchart showing operation of an output management unit in Embodiment 1.

FIG. 7 is a flowchart showing operation of the output management unit 1214 in Embodiment 1. When called by the verification execution unit 1212 in step S14 (FIG. 5), the output management unit 1214 starts operation in the secure execution environment 1200.

In step S31, the output management unit 1214 acquires output (data of the output value) from the output 1132 of the highly reliable function unit 1130 to be verified.

In step S32, the output management unit 1214 acquires, for the combination of the current operation mode and the verification data entry 2000 of the highly reliable function unit 1130 to be verified, the output control flag from the highly reliable function verification table 1220.

In step S33, the output management unit 1214 determines whether the acquired output control flag indicates that control transition is performed (a normal flow is performed). Processing proceeds to step S34 when it is determined that the output control flag does not indicate that control transition is performed, and proceeds to step S35 when it is determined that the output control flag indicates that control transition is performed.

In step S34, the output management unit 1214 discards the output acquired in step S31 not to perform control transition. That is to say, the output management unit 1214 does not pass control of the highly reliable function unit 1130 to the calling normal function unit 1120. For example, when not processing in step S5 (processing to register execution of the verification execution unit 1212 in the highly reliable function calling unit 1121 of the normal function unit 1120) but processing in step S4 (processing to set the verification operation timing) is performed, operation is verified not in synchronization with operation of the normal function unit 1120. The output control flag may thus be set so that step S34 is performed in such a case. After step S34, operation in FIG. 7 ends.

In step S35, the output management unit 1214 performs control transition without discarding the output acquired in step S31 after the verification execution unit 1212 performs the highly reliable function unit 1130. That is to say, the output management unit 1214 passes control of the highly reliable function unit 1130 to the calling normal function unit 1120. For example, when processing in step S5 (processing to register execution of the verification execution unit 1212 in the highly reliable function calling unit 1121 of the normal function unit 1120) is performed, the verification execution unit 1212 is executed during operation of the normal function unit 1120. The output control flag may thus be set so that step S35 is performed in such a case. After step S35, operation in FIG. 7 ends.

<Operation of Operation Log Acquisition Unit>

FIG. 8 is a flowchart showing operation of the operation log acquisition unit 1215 in Embodiment 1. When called by the verification execution unit 1212 in step S15 (FIG. 5), the operation log acquisition unit 1215 starts operation in the secure execution environment 1200.

In step S41, the operation log acquisition unit 1215 acquires the operation log of the highly reliable function unit 1130, the normal function unit 1120, and the system operating during steps S12 to S14. Operation in FIG. 8 then ends.

<Operation of Health Determination Unit>

Figure 9:
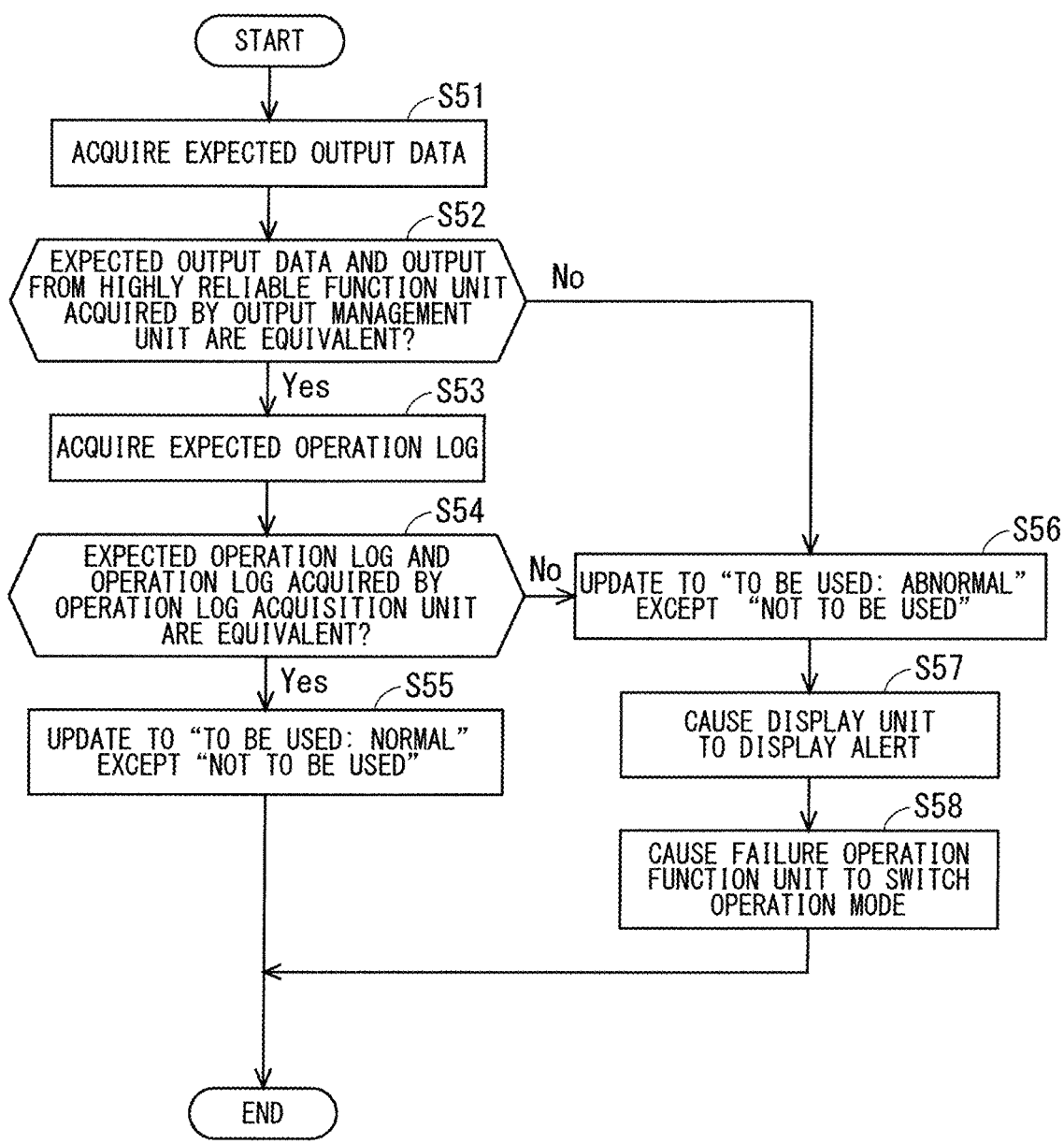
FIG. 9 is a flowchart showing operation of a health determination unit in Embodiment 1.

FIG. 9 is a flowchart showing operation of the health determination unit 1216 in Embodiment 1. When called by the verification execution unit 1212 in step S16 (FIG. 5), the health determination unit 1216 starts operation in the secure execution environment 1200.

In step S51, the health determination unit 1216 acquires, for the combination of the current operation mode and the verification data entry 2000 of the highly reliable function unit 1130 to be verified, the expected output data from the highly reliable function verification table 1220.

In step S52, the health determination unit 1216 compares the expected output data acquired in step S51 and the output from the highly reliable function unit 1130 acquired by the output management unit 1214 in step S31, and determines whether they are equivalent. Processing proceeds to step S53 when it is determined that they are equivalent, and proceeds to step S56 when it is determined that they are not equivalent.

In step S53, the health determination unit 1216 acquires, for the combination of the current operation mode and the verification data entry 2000 of the highly reliable function unit 1130 to be verified, the expected operation log from the highly reliable function verification table 1220.

In step S54, the health determination unit 1216 compares the expected operation log acquired in step S53 and the operation log acquired by the operation log acquisition unit 1215 in step S41, and determines whether they are equivalent. Processing proceeds to step S55 when it is determined that they are equivalent, and proceeds to step S56 when it is determined that they are not equivalent.

In step S55, the health determination unit 1216 checks, for the combination of the current operation mode and the state data entry 3000 of the highly reliable function unit 1130 to be verified, whether "NOT TO BE USED" is held in the highly reliable function state table 1240. The health determination unit 1216 updates the contents of the highly reliable function state table 1240 for the above-mentioned combination to "TO BE USED: NORMAL" except when the health determination unit 1216 checks that "NOT TO BE USED" is held. The normal state data is thereby held in the highly reliable function state table 1240. Operation in FIG. 9 then ends.

In step S56, the health determination unit 1216 checks, for the combination of the current operation mode and the state data entry 3000 of the highly reliable function unit 1130 to be verified, whether "NOT TO BE USED" is held in the highly reliable function state table 1240. The health determination unit 1216 updates the contents of the highly reliable function state table 1240 for the above-mentioned combination to "TO BE USED: ABNORMAL" except when the health determination unit 1216 checks that "NOT TO BE USED" is held. The abnormal state data is thereby held in the highly reliable function state table 1240.

In step S57, the health determination unit 1216 executes the display unit 1217, and the display unit 1217 displays an alert indicating that the highly reliable function unit 1130 used in the current operation mode is not operable, that is, abnormality.

In step S58, the health determination unit 1216 entrusts execution control to the failure operation function unit 1111 of the operation mode management function unit 1110, and the failure operation function unit 1111 switches the operation mode. Operation in FIG. 9 then ends.

<Operation of Time Management Function Unit when Time Measured by Timer Exceeds Maximum Verification Time>

Figure 10:
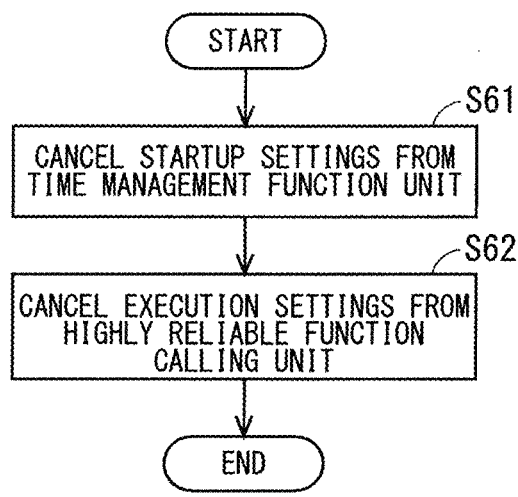
FIG. 10 is a flowchart showing cancellation operation of a time management function unit in Embodiment 1.

FIG. 10 is a flowchart showing event processing fired and performed by the time management function unit 1230 in Embodiment 1 when a time measured by the timer exceeds the maximum verification time set for the time management function unit 1230 by the verification execution unit 1212 in step S11. Operation in FIG. 10 is performed in the secure execution environment 1200.

In step S61, the time management function unit 1230 cancels all the startup settings of the verification execution unit 1212 set in step S4 (FIG. 4) from the time management function unit 1230.

In step S62, the time management function unit 1230 cancels all the execution settings of the verification execution unit 1212 registered in step S5 (FIG. 4) from the highly reliable function calling unit 1121. Operation in FIG. 10 then ends.

The time management function unit 1230 may cause the display unit 1217 to display an alert when performing operation in FIG. 10.

Summary of Embodiment 1

According to the information processing apparatus 1000 according to Embodiment 1 as described above, operation of the highly reliable function unit 1130 is verified with the timing and the maximum time of verifying operation being managed in the secure execution environment 1200. Such a configuration allows for planned, safe, and secure verification of operation of the highly reliable function unit 1130 that can be performed on the system while the normal function unit 1120 performs processing without interfering with processing being performed by the normal function unit 1120. Fault resistance and availability can thus continuously be verified, proved, and ensured in the system.

The verification timing can be set for each of the highly reliable function units 1130 that can be performed on the system while the normal function unit 1120 performs processing, so that operation of the highly reliable function unit 1130 can be verified at appropriate timing.

Furthermore, contents of verification can be set for each of the operation modes of the system, so that appropriate verification can be performed for each of the operation modes.

Embodiment 2

Figure 11:
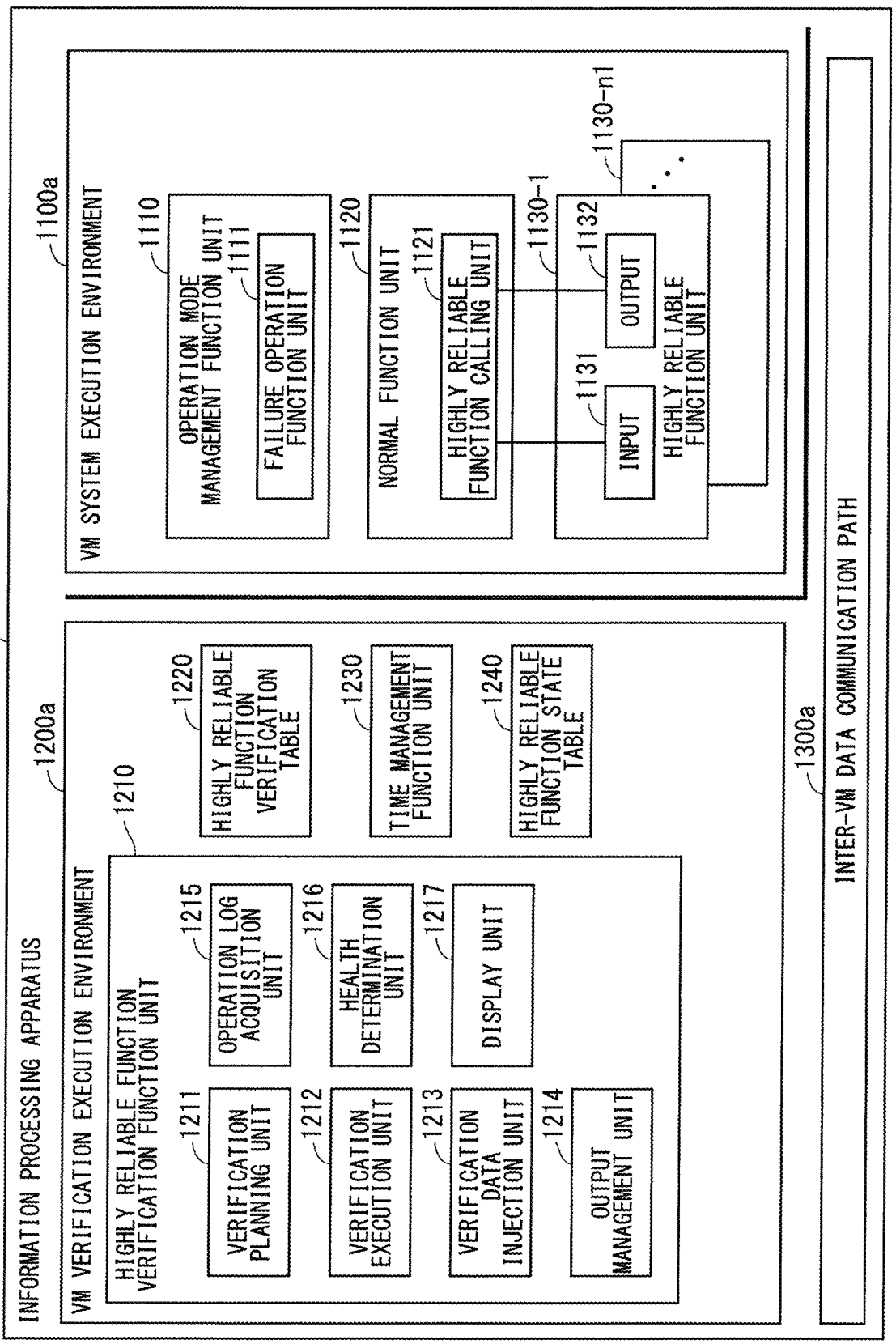
FIG. 11 is a block diagram showing a configuration of an information processing apparatus in Embodiment 2.

FIG. 11 is a block diagram showing a configuration of the information processing apparatus 1000 in Embodiment 2. Components according to Embodiment 2 that are the same as or similar to the above-mentioned components bear reference signs that are the same as or similar to those of the above-mentioned components, and different components will mainly be described below.

In Embodiment 2, the system execution environment 1100, the secure execution environment 1200, and the secure data path 1300 in Embodiment 1 have respectively been replaced with a VM system execution environment 1100*a*, a VM verification execution environment 1200*a*, and an inter-VM data communication path 1300*a*. VM is an abbreviation for a virtual machine. In Embodiment 2, the VM verification execution environment 1200*a* that is a secure verification execution environment substantially isolated from them VM system execution environment 1100*a* is achieved by the virtual machine.

According to the information processing apparatus 1000 according to Embodiment 2 as described above, the highly reliable function unit 1130 can continuously be verified as in Embodiment 1. The system execution environment and the verification execution environment may substantially be separated by an operating system (OS) container function that can create a substantially isolated application execution environment on a single OS.

Embodiment 3

Figure 12:
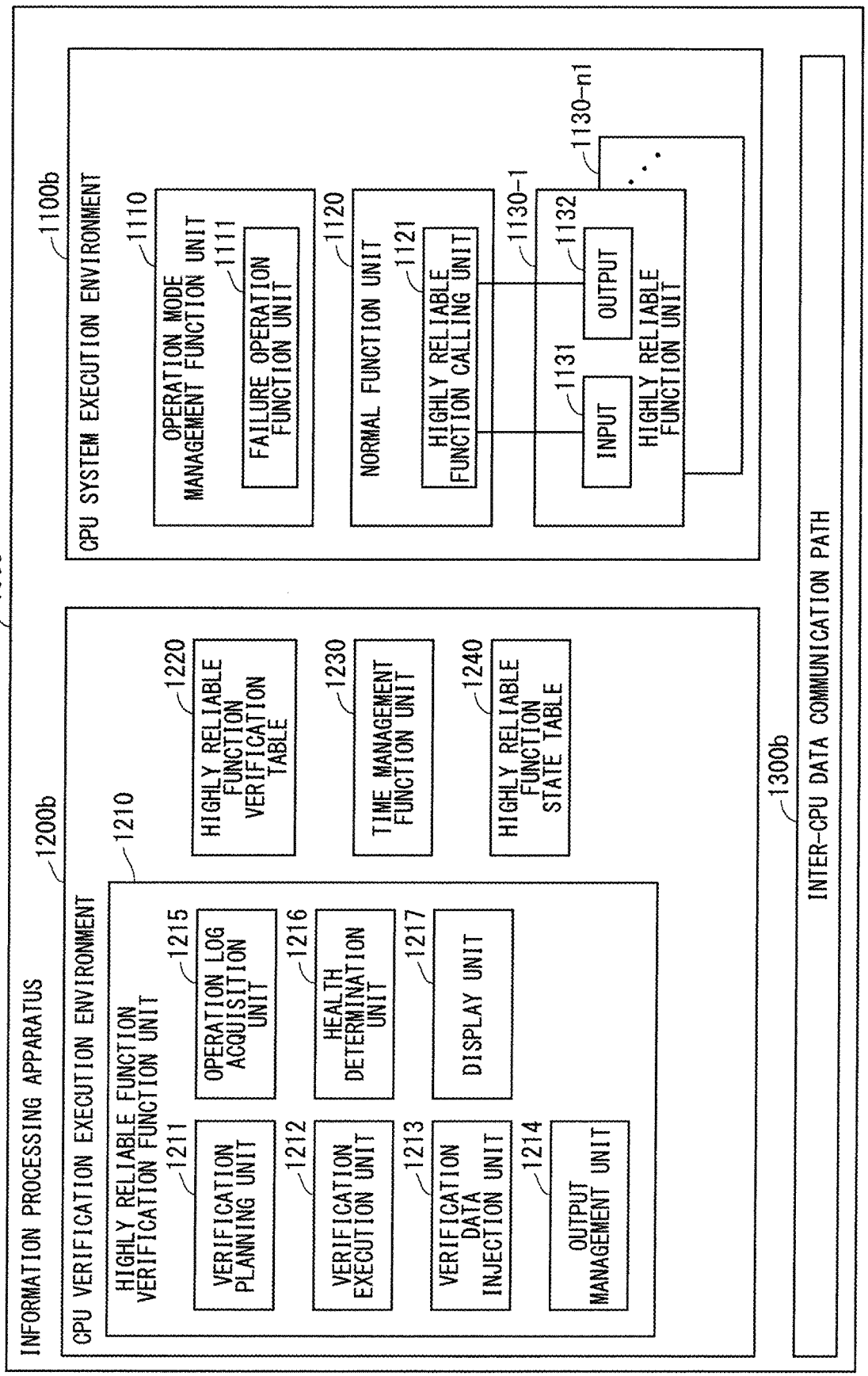
FIG. 12 is a block diagram showing a configuration of an information processing apparatus in Embodiment 3.

FIG. 12 is a block diagram showing a configuration of the information processing apparatus 1000 in Embodiment 3. Components according to Embodiment 3 that are the same as or similar to the above-mentioned components bear reference signs that are the same as or similar to those of the above-mentioned components, and different components will mainly be described below.

In Embodiment 3, the system execution environment 1100, the secure execution environment 1200, and the secure data path 1300 in Embodiment 1 have respectively been replaced with a CPU system execution environment 1100*b*, a CPU verification execution environment 1200*b*, and an inter-CPU data communication path 1300*b*. CPU is an abbreviation for a central processing unit. In Embodiment 3, the CPU system execution environment 1100*b* is achieved on single CPU hardware, and the CPU verification execution environment 1200*b* that is a secure verification execution environment substantially isolated from the CPU system execution environment 1100*b* is achieved on different CPU hardware.

According to the information processing apparatus 1000 according to Embodiment 3 as described above, the highly reliable function unit 1130 can continuously be verified as in Embodiment 1. Hardware to achieve the execution environment is not limited to the CPU, and is only required to be hardware that can process a field programmable gate array (FPGA), a graphics processing unit (GPU), and a program of dedicated hardware and the like.

Modifications

The highly reliable function units 1130, the normal function unit 1120, the highly reliable function verification function unit 1210, and the time management function unit 1230 in FIG. 1 described above are referred to as the "highly reliable function units 1130 and the like" below. The highly reliable function units 1130 and the like are achieved by a processing circuit 81 shown in FIG. 13. That is to say, the processing circuit 81 includes the plurality of highly reliable function units 1130 each including the input 1131 and the output 1132; the normal function unit 1120 capable of performing processing in the system execution environment 1100, and capable of calling one of the highly reliable function units 1130 corresponding to the processing and injecting data used to perform the highly reliable function unit 1130 into the input 1131 while performing the processing; the highly reliable function verification function unit 1210 to inject the injected verification data into the input 1131 to perform the highly reliable function unit 1130, and verify operation of the highly reliable function unit 1130 based on output from the output 1132 when performing the highly reliable function unit 1130 in the secure execution environment 1200; and the time management function unit 1230 to manage timing of verifying operation and the maximum time of verifying operation. Dedicated hardware or a processor to execute a program stored in a memory may be applied to the processing circuit 81. The processor corresponds to a central processing unit, a processing unit, an arithmetic unit, a microprocessor, a microcomputer, a digital signal processor (DSP), and the like, for example.

When the processing circuit 81 is the dedicated hardware, the processing circuit 81 corresponds to a single circuit, a composite circuit, a programmed processor, a parallel programmed processor, an application specific integrated circuit (ASIC), the FPGA, and a combination thereof, for example. The functions of the components, such as the highly reliable function units 1130 and the like, may be achieved by distributed processing circuits, or may collectively be achieved by a single processing circuit.

When the processing circuit 81 is the processor, the functions of the highly reliable function units 1130 and the like are achieved by combination with software and the like. The software and the like correspond to software, firmware, or software and firmware, for example. The software and the like are described as the program, and stored in the memory. As shown in FIG. 14, a processor 82 applied to the processing circuit 81 reads and executes the program stored in a memory 83 to achieve the functions of the components. That is to say, the information processing apparatus 1000 includes the memory 83 to store the program which, when executed by the processing circuit 81, results in performance of steps including: using the normal function unit 1120 capable of performing processing in the system execution environment 1100, calling one of the plurality of highly reliable function units 1130 corresponding to the processing and injecting data used to perform the highly reliable function unit 1130 into the input 1131 while performing the processing; using the highly reliable function verification function unit 1210, injecting the injected verification data into the input 1131 to perform the highly reliable function unit 1130, and verifying operation of the highly reliable function unit 1130 based on output from the output 1132 when performing the highly reliable function unit 1130 in the secure execution environment 1200; and, using the time management function unit 1230, managing timing of verifying operation and the maximum time of verifying operation. In other words, the program causes a computer to execute procedures or methods of the highly reliable function units 1130 and the like. The memory 83 herein may be, for example, a nonvolatile or volatile semiconductor memory, such as a random access memory (RAM), a read only memory (ROM), a flash memory, an erasable programmable read only memory (EPROM), and an electrically erasable programmable read only memory (EEPROM), a hard disk drive (HDD), a magnetic disk, a flexible disk, an optical disc, a compact disc, a mini disc, a digital versatile disc (DVD), a drive device thereof, and the like or any storage medium to be used in the future.

A configuration in which the functions of the highly reliable function units 1130 and the like are achieved either by hardware or by software is described above. The configuration, however, is not limited to this configuration, and may be a configuration in which one or more of the highly reliable function units 1130 and the like are achieved by dedicated hardware, and the other one or more components are achieved by software and the like. For example, the functions of the highly reliable function units 1130 can be achieved by the processing circuit 81, an interface, a receiver, and the like as the dedicated hardware, and the functions of the other components can be achieved by the processing circuit 81 as the processor 82 reading and executing the program stored in the memory 83.

As described above, the processing circuit 81 can achieve the above-mentioned functions by hardware, software, or a combination thereof.

The operation mode management function unit 1110 and steps performed by the operation mode management function unit 1110 can similarly be achieved as described above. The normal function unit 1120, the highly reliable function verification function unit 1210, the time management function unit 1230, and the operation mode management function unit 1110 may respectively correspond to a normal program, a highly reliable function verification program, a time management program, and an operation mode management program.

Embodiments and modifications can freely be combined with each other, and can be modified or omitted as appropriate.

The foregoing description is in all aspects illustrative and not restrictive. It is understood that numerous unillustrated modifications can be devised.

EXPLANATION OF REFERENCE SIGNS 1000 information processing apparatus, 1100 system execution environment, 1110 operation mode management function unit, 1111 failure operation function unit, 1120 normal function unit, 1130 highly reliable function unit, 1131 input, 1132 output, 1200 secure execution environment, 1210 highly reliable function verification function unit, 1211 verification planning unit, 1212 verification execution unit, 1213 verification data injection unit, 1214 output management unit, 1215 operation log acquisition unit, 1216 health determination unit, 1217 display unit, 1220 highly reliable function verification table, 1230 time management function unit, 1240 highly reliable function state table.

The invention claimed is:

1. An information processing apparatus of an autonomous driving system mounted on an autonomous vehicle, the apparatus comprising:
   a plurality of highly reliable function circuitries each including an input and an output;
   a normal function circuitry capable of performing processing in a system execution environment, and capable of calling one of the highly reliable function circuitries corresponding to the processing and injecting data used to perform the highly reliable function circuitry into the input while performing the processing;
   a verification table to hold injected verification data used to verify operation of the highly reliable function circuitry;

a verification function circuitry to inject the injected verification data into the input to perform the highly reliable function circuitry, and verify operation of the highly reliable function circuitry based on output from the output when performing the highly reliable function circuitry in a verification execution environment being a secure execution environment against the system execution environment; and a time management function circuitry to manage timing of verifying operation and a maximum time of verifying operation, wherein the verification table further holds:

verification operation timing indicating timing of starting verifying operation;

expected output data indicting expected output from the output when the verification function circuitry performs the highly reliable function circuitry;

an expected operation log indicting an expected operation log of the highly reliable function circuitry when the verification function circuitry performs the highly reliable function circuitry;

an output control flag indicating whether the execution transition to the normal function circuitry is performed after the verification function circuitry performs the highly reliable function circuitry; and a maximum verification time indicating a maximum allowable time of verifying operation, wherein the verification function circuitry is configured to continuously verify the operation of the highly reliable function circuitry in the autonomous driving system mounted on the autonomous vehicle.

2. The information processing apparatus according to claim 1, wherein the verification function circuitry comprises:

a verification planning circuitry to determine a highly reliable function circuitry to be verified from the plurality of highly reliable function circuitries based on the verification operation timing, and plan timing of verifying operation of the highly reliable function circuitry to be verified;

a verification data injection circuitry to inject the injected verification data into the input of the highly reliable function circuitry to be verified;

a verification execution circuitry to perform, at the timing planned by the verification planning circuitry, the highly reliable function circuitry to be verified into which the injected verification data has been injected;

an output management circuitry to acquire, when the verification execution circuitry has performed the highly reliable function circuitry to be verified, output from the output of the highly reliable function circuitry to be verified, and cause the normal function circuitry to perform the highly reliable function circuitry to be verified based on the output control flag;

an operation log acquisition circuitry to acquire an operation log of the highly reliable function circuitry to be verified when the verification execution circuitry has performed the highly reliable function circuitry to be verified; and a health determination circuitry to determine health of the highly reliable function circuitry to be verified based on comparison between the output acquired by the output management circuitry and the expected output data and comparison between the operation log acquired by the operation log acquisition circuitry and the expected operation log.

3. An information processing apparatus of an autonomous driving system mounted on an autonomous vehicle, the apparatus comprising:

a plurality of highly reliable function circuitries each including an input and an output;

a normal function circuitry capable of performing processing in a system execution environment, and capable of calling one of the highly reliable function circuitries corresponding to the processing and injecting data used to perform the highly reliable function circuitry into the input while performing the processing;

a verification table to hold injected verification data used to verify operation of the highly reliable function circuitry;

a verification function circuitry to inject the injected verification data into the input to perform the highly reliable function circuitry, and verify operation of the highly reliable function circuitry based on output from the output when performing the highly reliable function circuitry in a verification execution environment being a secure execution environment against the system execution environment;

a time management function circuitry to manage timing of verifying operation and a maximum time of verifying operation, a state table to hold, as a result of verifying operation, state data indicating whether the highly reliable function circuitry is normal, and an operation mode management function circuitry to manage an operation mode operated by a system in the system execution environment, wherein for each operation mode, the state table comprises at least one of:

usability data indicating whether the highly reliable function circuitry is to be used;

normal state data indicating that the highly reliable function circuitry to be used is normal;

abnormal state data indicating that the highly reliable function circuitry to be used is abnormal; and operation mode possibility data indicating whether the highly reliable function circuitry used in the operation mode is operable, wherein the verification function circuitry is configured to continuously verify the operation of the highly reliable function circuitry in the autonomous driving system mounted on the autonomous vehicle.

4. The information processing apparatus according to claim 3, wherein the verification function circuitry updates the state data held by the state table each time operation is verified.

5. The information processing apparatus according to claim 3, wherein the operation mode management function circuitry further comprises a failure operation function circuitry to switch the operation mode operated by the system when the state table includes the abnormal state data for the highly reliable function circuitry used in the operation mode managed by the operation mode management function circuitry.

6. The information processing apparatus according to claim 3, further comprising a display circuitry to display abnormality when the state table includes the abnormal state data for the highly reliable function circuitry used in the operation mode managed by the operation mode management function circuitry.

7. An information processing method performed by an autonomous driving system mounted on an autonomous vehicle, the method comprising:

while a normal function circuitry capable of performing processing in a system execution environment performs the processing, calling, from among a plurality of highly reliable function circuitries each including an input and an output, a highly reliable function circuitry corresponding to the processing, and injecting data used to perform the highly reliable function circuitry into the input;

holding, in a verification table, injected verification data used to verify operation of the highly reliable function circuitry;

injecting, using a verification function circuitry, the injected verification data into the input to perform the highly reliable function circuitry, and verifying operation of the highly reliable function circuitry based on output from the output when the highly reliable function circuitry is performed in a verification execution environment being a secure execution environment against the system execution environment; and managing, using a time management function circuitry, timing of verifying operation and a maximum time of verifying operation, wherein the verification table further holds:

verification operation timing indicating timing of starting verifying operation;

expected output data indicting expected output from the output when the verification function circuitry performs the highly reliable function circuitry;

an expected operation log indicting an expected operation log of the highly reliable function circuitry when the verification function circuitry performs the highly reliable function circuitry;

an output control flag indicating whether the execution transition to the normal function circuitry is performed after the verification function circuitry performs the highly reliable function circuitry;

a maximum verification time indicating a maximum allowable time of verifying operation; and performing the verifying operation to continuously verify operation of the highly reliable function circuitry in the autonomous driving system mounted on the autonomous vehicle.

* * * * *